(12) United States Patent
Arikawa

(10) Patent No.: US 9,416,909 B2
(45) Date of Patent: Aug. 16, 2016

(54) ACCUMULATOR

(71) Applicant: EAGLE INDUSTRY CO., LTD., Tokyo (JP)

(72) Inventor: Tatsuhiro Arikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/783,329

(22) PCT Filed: May 26, 2014

(86) PCT No.: PCT/JP2014/063786
§ 371 (c)(1),
(2) Date: Oct. 8, 2015

(87) PCT Pub. No.: WO2015/015882
PCT Pub. Date: Feb. 5, 2015

(65) Prior Publication Data
US 2016/0053933 A1    Feb. 25, 2016

(30) Foreign Application Priority Data

Jul. 29, 2013 (JP) ................ 2013-156641

(51) Int. Cl.
| F16L 55/04 | (2006.01) |
| F16L 55/24 | (2006.01) |
| F16B 5/08  | (2006.01) |
| F15B 1/08  | (2006.01) |

(52) U.S. Cl.
CPC . *F16L 55/24* (2013.01); *F15B 1/08* (2013.01); *F16B 5/08* (2013.01); *F15B 2201/415* (2013.01)

(58) Field of Classification Search
CPC ... F16L 55/24; F16L 55/132; F15B 2201/415
USPC ................................ 138/30, 31, 89
See application file for complete search history.

(56) References Cited

U.S. PATENT DOCUMENTS

| 2,378,467 A | 6/1945 | De Kiss |
| 3,907,000 A | 9/1975 | Carr |
| 3,993,102 A * | 11/1976 | Polster ............ F16L 55/115 138/89 |

(Continued)

FOREIGN PATENT DOCUMENTS

| DE | 10320373 A1 | 12/2004 |
| EP | 1026406 A1 | 8/2000 |

(Continued)

OTHER PUBLICATIONS

Chinese Office Action dated Apr. 6, 2016.

*Primary Examiner* — Patrick F Brinson
(74) *Attorney, Agent, or Firm* — Harness, Dickey & Pierce, P.L.C.

(57) ABSTRACT

An accumulator (100) includes: a housing (110) having an injection opening (112b) into which pressure gas is injected. A gas plug (150) seals the pressure gas in the housing (110). The housing (110) includes: a concave portion to which the gas plug (150) is fitted, and to which the gas plug (150) is welded with the welding portion (151) being melted on its bottom surface (110a). An inclined surface (110c) that extends from an edge portion of the concave portion toward an outside of the housing (110) such that a distance from a center of the injection opening (112b) increases, and the gas plug (150) includes a flange (152) which makes contact with the inclined surface (110c).

2 Claims, 6 Drawing Sheets

(56) References Cited

U.S. PATENT DOCUMENTS

| | | | | |
|---|---|---|---|---|
| 4,234,016 | A | * 11/1980 | Horino | F15B 1/125 138/30 |
| 4,733,872 | A | 3/1988 | Sugimura | |
| 4,958,743 | A | * 9/1990 | Hatton | F16B 37/065 138/89 |
| 5,215,124 | A | * 6/1993 | Hattori | F15B 1/10 138/26 |
| 5,320,460 | A | * 6/1994 | Murakami | B65D 53/06 138/89 |
| 6,016,841 | A | * 1/2000 | Larsen | F16L 55/053 138/30 |
| 6,019,135 | A | * 2/2000 | Onishi | F02M 55/025 138/26 |
| 6,155,301 | A | * 12/2000 | Ohji | F15B 1/027 138/30 |
| 6,286,552 | B1 | * 9/2001 | Shimbori | B23K 11/002 138/30 |
| 6,382,456 | B1 | * 5/2002 | Onishi | F02M 63/0225 123/467 |
| 6,525,290 | B2 | * 2/2003 | Shimbori | B23K 11/002 219/91.2 |
| 6,527,012 | B1 | * 3/2003 | Weber | F15B 1/103 138/30 |
| 6,622,755 | B2 | * 9/2003 | Weber | F15B 1/103 138/30 |
| 6,789,576 | B2 | * 9/2004 | Umetsu | F15B 1/103 138/30 |
| 6,848,755 | B2 | * 2/2005 | Yuda | F15B 1/103 138/30 |
| 6,892,765 | B2 | * 5/2005 | Kamimura | F15B 1/103 138/30 |
| 7,318,452 | B2 | * 1/2008 | Yoshihara | F15B 1/103 138/26 |
| 7,591,284 | B2 | * 9/2009 | Kort | F15B 1/16 138/30 |
| 2008/0060711 | A1 | * 3/2008 | Kort | F15B 1/16 138/31 |

FOREIGN PATENT DOCUMENTS

| | | |
|---|---|---|
| JP | S50-139419 A | 11/1975 |
| JP | H11-101343 A | 4/1999 |
| JP | 2001-173601 A | 6/2001 |
| JP | 2005-282730 A | 10/2005 |
| JP | 3149039 U | 3/2009 |

* cited by examiner

ACCUMULATOR

CROSS-REFERENCE TO RELATED APPLICATIONS

This application is a National Stage of International Application No. PCT/JP2014/063786, filed May 26, 2014. The entire disclosure of the above application is incorporated herein by reference.

FIELD

The present disclosure relates to an accumulator including a housing that includes an injection opening into which gas is injected, and a gas plug that occludes the injection opening.

BACKGROUND

Conventionally, there has been known an accumulator including a housing that includes an injection opening into which pressure gas is injected, and a gas plug as a gas plug that occludes the injection opening. In this accumulator, the gas plug is fixed to the housing by welding so that the pressure gas is sealed in the housing.

An accumulator according to a conventional example will be described with reference to FIGS. 5A to 6B. FIGS. 5A and 6A are schematic cross-sectional views illustrating a gas plug 350 according to the conventional example. FIGS. 5B and 6B are views illustrating a state where the gas plug 350 according to the conventional example is welded, and are enlarged cross-sectional views illustrating the vicinity of an injection opening 112b of a housing 110.

As illustrated in FIG. 5A, the gas plug 350 according to the conventional example is made of metal, and has a welding portion 351 on a lower surface 350a of the gas plug 350. The gas plug 350 is welded to the housing 110 by melting the welding portion 351 in a state where the welding portion 351 is making contact with the housing 110. In such a configuration, as illustrated in FIG. 5B, because the welded gas plug 350 protrudes from the housing 110, an overall length of the accumulator 100 is extended.

Therefore, due to a demand for downsizing the accumulator 100, as illustrated in FIG. 6B, there has been proposed a configuration including a concave portion to which the gas plug 350 occluding the injection opening 112b is fitted (e.g., Patent Literature 1). Owing to such a configuration, the size of the accumulator 100 as a whole can be reduced when compared with the configuration not including the concave portion, as illustrated in FIG. 5B, since the gas plug 350 does not protrude from the housing 110.

According to the configuration illustrated in FIGS. 6A and 6B, the gas plug 350 is welded to the housing 110 by melting the welding portion 351 in a state where the welding portion 351 is making contact with a bottom surface 110a of the concave portion. When the welding portion 351 is melted, an outer peripheral portion of the gas plug 350 may be deformed, such as being expanded. Therefore, it is essential that a space S is provided between an inner peripheral surface 110b of the concave portion of the housing 110 and the gas plug 350 in a state where the gas plug 350 is fitted to the concave portion.

In such a configuration, there may be a case, depending on a usage environment of the accumulator 100, where a foreign matter, such as water or dust, enters the space S. Particularly, when water or other liquids (e.g., engine oil, brake fluid, suspension fluid, and the like) are collected in the space S, surface processing, such as plating, paint and the like, of individual members may be affected. As a result, rust and the like may be formed on the surfaces of the gas plug or the housing, and a problem, such as degradation of the strengths of those members, may arise.

CITATION LIST

Patent Literature

Patent Literature 1: Japanese Patent Application Laid-Open Publication No. 2005-282730

SUMMARY

Technical Problem

An object of the present disclosure is to provide an accumulator that prevents foreign matters from entering a space between a housing and a gas plug that is fitted to a concave portion of the housing.

Solution to Problem

The present disclosure has employed the following means to solve the above problem.

That is, the accumulator according to the present disclosure is an accumulator including: a housing having an injection opening into which gas is injected; and a gas plug occluding the injection opening, the accumulator sealing the gas in the housing by the gas plug that is welded to the housing with a welding portion of the gas plug being melted, wherein the housing includes: a concave portion to which the gas plug occluding the injection opening is fitted, and to which the gas plug is welded with the welding portion being melted; and an inclined surface that extends from an edge portion of the concave portion toward an outside of the housing such that a distance from a center of the injection opening increases, and the gas plug includes a flange which makes contact with the inclined surface in a state of being fitted and welded to the concave portion.

According to this configuration, by considering deformation of an outer shape of the gas plug due to the melting of the welding portion, it is necessary to provide a space between the gas plug and the concave portion of the housing. However, because the flange of the gas plug makes contact with the inclined surface of the housing, a foreign matter hardly enters the space from the outside. Therefore, it is possible to suppress degradation of the strengths of individual members due to the entering of the foreign matter.

Furthermore, the flange of the gas plug may include an inclined surface which makes contact with the inclined surface of the housing. According to this configuration, the flange and the inclined surface of the housing make surface contact with each other so that the flange and the inclined surface of the housing make more secure contact, and hence it becomes more difficult for the foreign matter to enter the space between the gas plug and concave portion of the housing. In addition, because the inclined surfaces are in contact with each other, an intrusion route of a foreign matter becomes long, and hence it becomes difficult for a foreign matter to enter the space between the gas plug and the concave portion of the housing.

Advantageous Effects of the Disclosure

As described above, according to the present disclosure, it is possible to provide an accumulator that prevents a foreign matter from entering a space between a housing and a gas plug that is fitted to a concave portion of the housing.

DRAWINGS

DETAILED DESCRIPTION

Hereinafter, modes for carrying out the present disclosure will be exemplarily described in detail based on embodiments thereof with reference to the drawings. However, the dimensions, materials, shapes, relative arrangements and so on of constituent parts described in the embodiments are not intended to limit the scope of the present disclosure to these alone in particular unless specifically described.

Example 1

Overall Configuration of Accumulator

Figure 1:
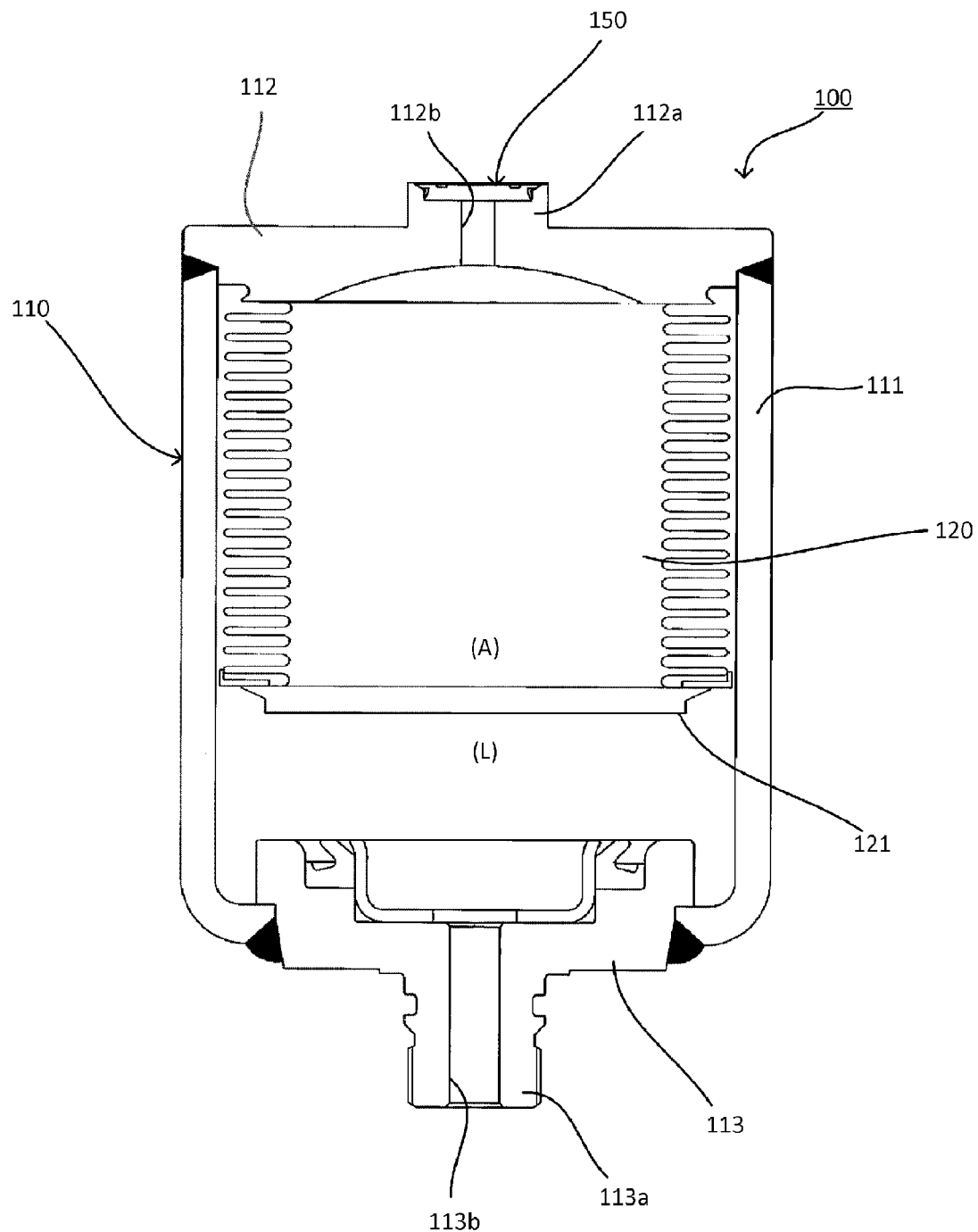
FIG. 1 is a schematic cross-sectional view illustrating an overall configuration of an accumulator according to Example 1.

First, with reference to FIG. 1, an overall configuration of an accumulator according to Example 1 of the present disclosure will be described. FIG. 1 is a schematic cross-sectional view illustrating an overall configuration of an accumulator according to Example 1 of the present disclosure. The accumulator according to the present example is used mainly in an environment where water or dust exists in the surroundings such as under a bonnet of a vehicle and the like.

An accumulator 100 according to Example 1 is so-called a metal bellows accumulator. The accumulator 100 has a housing 110 formed from a cylindrical shell 111 with a gas end cover 112 welded to one end side (an upper side in FIG. 1) thereof and a port member 113 welded to another end side (lower side in FIG. 1) thereof. A bellows 120 is contained inside the housing 110.

One end side of the bellows 120 is fixed to the gas end cover 112, and another end side thereof is provided with an end member 121 so that it is capable of making expansion-and-contraction (reciprocation) movement in a vertical direction in FIG. 1. By providing the bellows 120 as described, an inside of the housing 110 is divided into a pressure sealing chamber A, which is an inside of the bellows 120, and a pressure inflow chamber L, which is an outside of the bellows 120. Pressure gas is sealed in the pressure sealing chamber A, and a pressure fluid flows into the pressure inflow chamber L. The bellows 120 makes expansion-and-contraction movement based on values of the pressure of the pressure gas in the pressure sealing chamber A and the pressure of the pressure fluid in the pressure inflow chamber L. For example, when the pressure of the pressure fluid in the pressure inflow chamber L becomes larger than the pressure of the pressure gas in the pressure sealing chamber A, the bellows 120 contracts.

The port member 113, which is one of the members that constitute the housing 110, includes a cylindrical attachment portion 113a for connecting the accumulator 100 to an unillustrated pressure pipe and the like on a hydraulic system side. In the attachment portion 113a, there is provided a pressure inflow port 113b for introducing a pressure fluid on a pipe side into the pressure inflow chamber L.

A gas end cover 112, which is one of the members that constitute the housing 110, is integrated with a hexagonal nut 112a which is used for connecting and fixing the accumulator 100 to a pressure pipe and the like on the hydraulic system side. At the center of the hexagonal nut 112a, there is provided an injection opening 112b for injecting the pressure gas into the housing 110. The pressure gas can be sealed in the housing 110, by occluding the injection opening 112b with a gas plug 150, in a state where the pressure gas is injected in the housing 110.

Configuration and Welding of Gas Plug

Figure 2A:
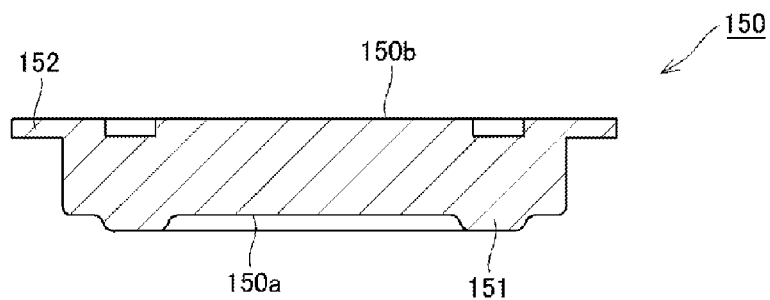
FIG. 2A is a schematic cross-sectional view illustrating a gas plug according to Example 1.
Figure 2B:
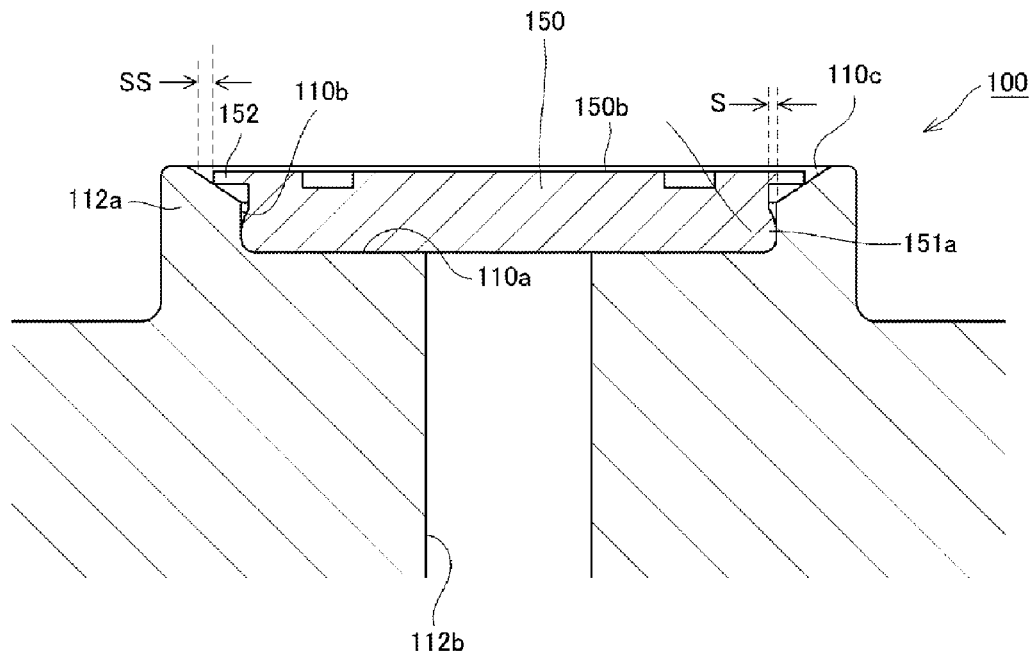
FIG. 2B is a view illustrating a state where the gas plug is welded, and is an enlarged cross-sectional view illustrating the vicinity of an injection opening of a housing.
Figure 3:
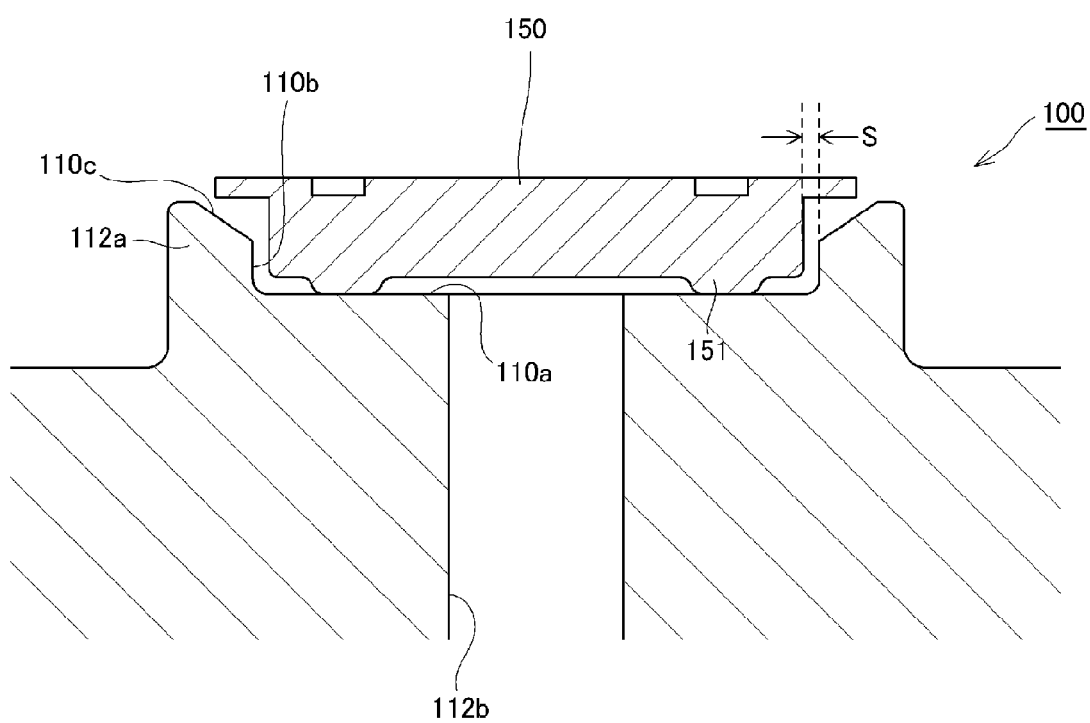
FIG. 3 is a schematic cross-sectional view illustrating a state where the gas plug in Example 1 is fitted to a concave portion of the housing, and illustrating a state before welding.

A configuration and welding of the gas plug in Example 1 will be described with reference to FIGS. 2A to 3. FIG. 2A is a schematic cross-sectional view illustrating the gas plug according to Example 1. FIG. 2B is a view illustrating a state where the gas plug is welded, and is an enlarged cross-sectional view illustrating the vicinity of the injection opening of the housing. FIG. 3 is a schematic cross-sectional view illustrating a state where the gas plug in Example 1 is fitted to a concave portion of the housing, and illustrating a state before welding. In the present example, the gas plug 150 is fixed to the housing 110 by welding.

The gas plug 150 according to Example 1 is a columnar member made of metal. The gas plug 150 has a welding portion 151. The welding portion 151 is formed by protruding a portion of a lower surface 150a (a lower surface in FIG. 2A) of the gas plug by press processing. By forming the welding portion 151 protruding downward from the lower surface 150a by the press processing as described, a portion of an upper surface 150b of the gas plug 150 is recessed. The welding portion 151 is formed to surround the injection opening 112b, and is provided to block the injection opening 112b from outside. Herein, a direction orthogonal to a seated surface of the gas plug 150 on the housing 110 (a contacting surface between the lower surface 150a of the gas plug and the bottom surface 110a of the concave portion of the housing 110) is defined as a vertical direction, a direction perpendicular to the seated surface is a lateral direction, and in the lateral direction, the midst of the injection opening 112b is defined as the center and a direction away from the center is defined as an outward side.

Further, the gas plug 150 according to Example 1 has a flange 152 as illustrated in FIG. 2A. In Example 1, the flange 152 extends to the outward side in the lateral direction of the gas plug 150 on an upper surface 150b side of the gas plug 150.

The housing 110 according to Example 1 has a concave portion to which the gas plug 150 occluding the injection opening 112b is fitted. Further, the housing 110 has an inclined surface 110c that extends from an edge portion of the concave portion toward an outside of the housing such that a distance from the center of the injection opening 112b increases, in other words, such that a distance between the opposing inclined surfaces increases from the bottom side to the top side of the drawing.

As illustrated in FIG. 3, in a state where the gas plug 150 is fitted to the concave portion, the welding portion 151 of the gas plug 150 is in contact with the bottom surface 110a of the concave portion. When the welding portion 151 is melted by melting heat in the state where the welding portion 151 is in contact with the bottom surface 110a, the gas plug 150 becomes in a state of being welded to the housing 110 as illustrated in FIG. 2B.

Advantageous Points of Example 1

Advantageous points of Example 1 will be described next. As described above, the gas plug 150 is fixed to the housing 110 by welding. At this point, because the welding portion 151 is melted, the outer peripheral portion of the gas plug 150 expands (an expanded portion 151a in FIG. 2B). Therefore, as illustrated in FIGS. 2B and 3, it is essential to provide a space S between the gas plug 150 and the inner peripheral surface 110b of the concave portion to which the gas plug 150 is fitted.

However, when the space S is provided, there may be a case, depending on a usage environment, where a foreign matter, such as liquid or dust, enters the space S from the outside of the accumulator 100. If the foreign matter adheres to the housing 110 or the gas plug 150 made of metal, formation of rust or the like may be caused and the strengths of each of those metal members may be degraded.

Therefore, in Example 1, the gas plug 150 includes the flange 152 that extends from the upper surface 150b side of the gas plug 150 to the outward side in the lateral direction. Further, the housing 110 includes the inclined surface 110c that extends from the edge portion of the concave portion to which the gas plug 150 is fitted toward the outside of the housing 110 such that the distance from the center of the injection opening 112b increases.

In a state where the gas plug 150 is fitted and welded to the concave portion of the housing 110, a front end of the flange 152 of the gas plug 150 is in contact with the inclined surface 110c of the housing 110. During welding, as the welding portion 151 is melted, the gas plug 150 moves so as to come closer to the bottom surface 110a of the concave portion, and stops at a position where the flange 152 makes contact with the inclined surface 110c, whereby the position of the gas plug 150 with respect to the housing 110 is determined. As described, by employing a method of fixing the gas plug 150 to the housing 110 by welding, the flange 152 can securely come into contact with the inclined surface 110c.

As described, owing to the configuration in which the flange 152 makes contact with the inclined surface 110c, the outside of the housing 110 is separated from the space S, and hence the entering of a foreign matter from the outside into the space S can be suppressed. Accordingly, it becomes possible to suppress the degradation of strengths of the gas plug 150 and the housing 110 made of metal due to rust and the like.

Note that, as illustrated in FIG. 2B, a slight space SS corresponding to the thickness of the flange 152 may be created between the flange 152 of the gas plug 150 and the inclined surface 110c of the housing 110. However, because the space SS is formed at a shallower position of the concave portion than the space S, the amount of foreign matters that can enter is smaller than that of the space S. In addition, even if a foreign matter enters the space SS, since the space SS is formed with the inclined surface 110c, the foreign matter can easily escape to the outside by the flow of a fluid (air) around the gas plug 150.

Example 2

Figure 4A:
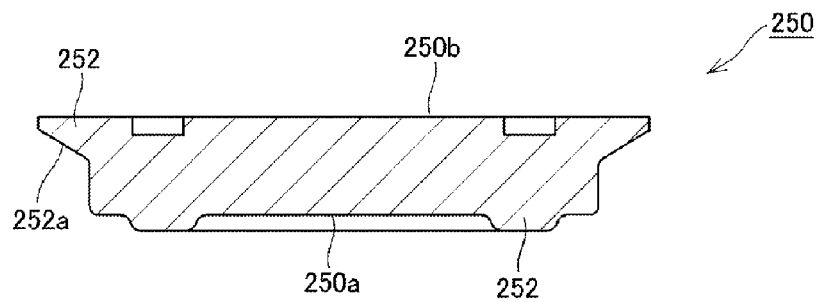
FIG. 4A is a schematic cross-sectional view illustrating a gas plug according to Example 2.
Figure 4B:
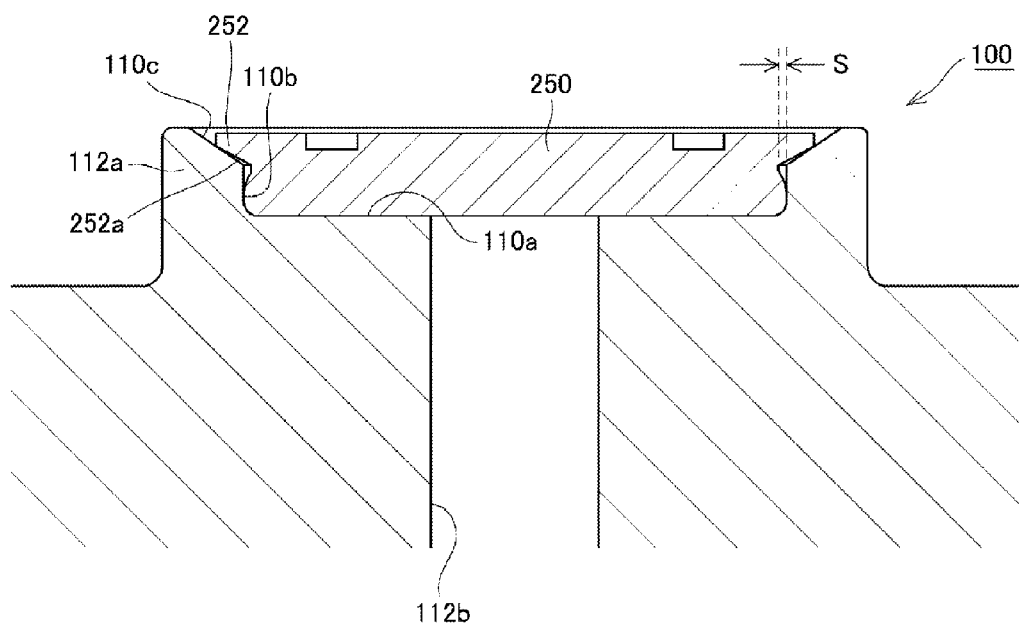
FIG. 4B is a view illustrating a state where the gas plug is welded, and is an enlarged cross-sectional view illustrating the vicinity of an injection opening of a housing.
Figure 5A:
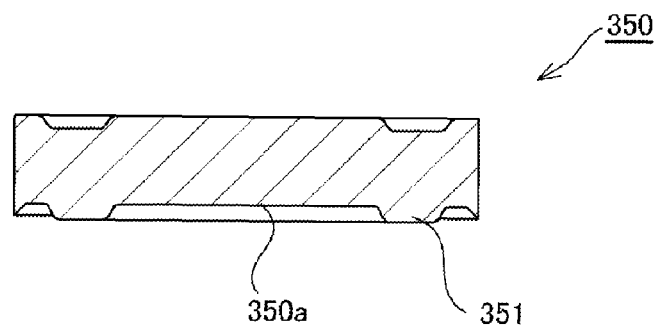
FIG. 5A is a schematic cross-sectional view illustrating a gas plug according to a conventional example.
Figure 5B:
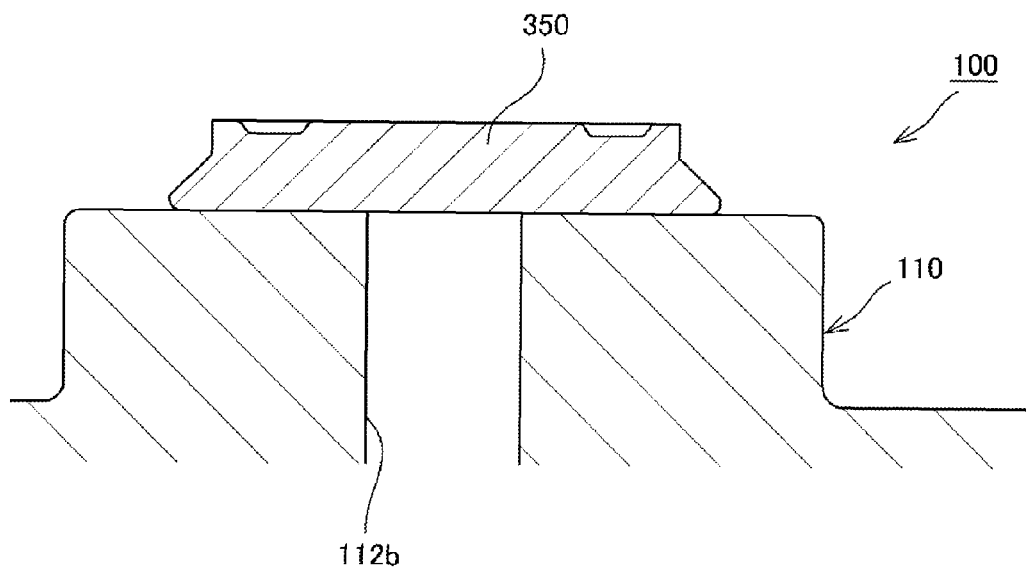
FIG. 5B is a view illustrating a state where the gas plug is welded, and is an enlarged cross-sectional view illustrating the vicinity of an injection opening of a housing.
Figure 6A:
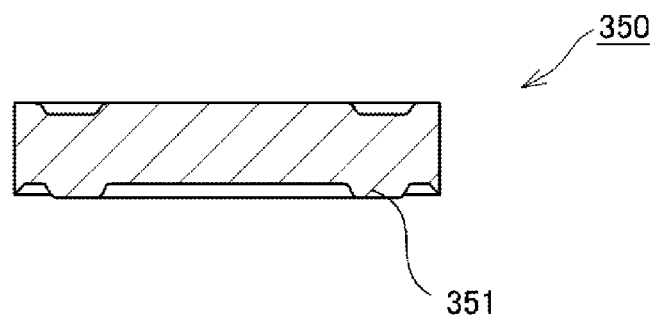
FIG. 6A is a schematic cross-sectional view illustrating a gas plug according to a conventional example.
Figure 6B:
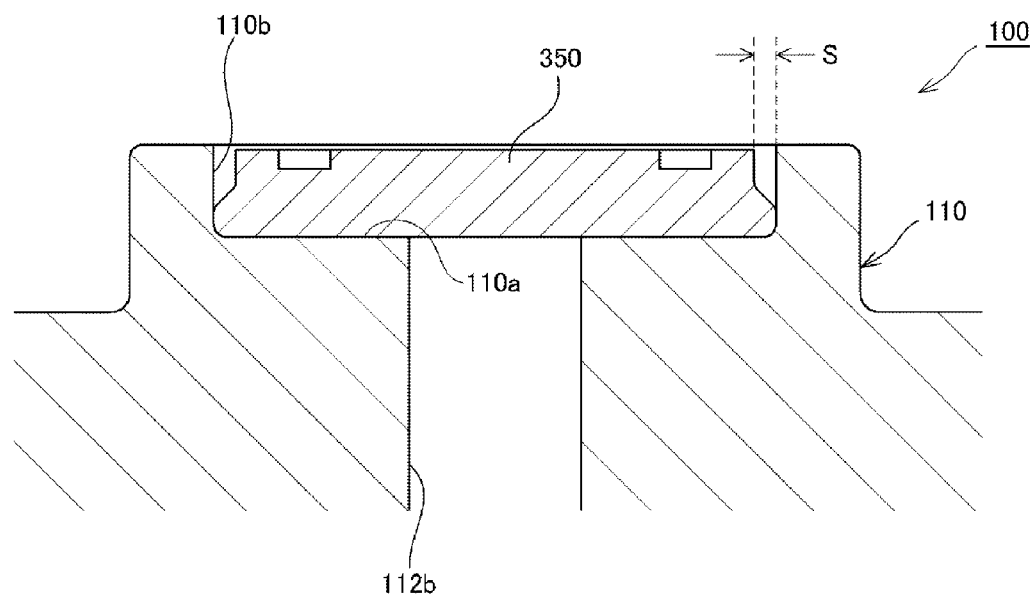
FIG. 6B is a view illustrating a state where the gas plug is welded, and is an enlarged cross-sectional view illustrating the vicinity of an injection opening of a housing.

Next, Example 2 will be described. FIG. 4A is a schematic cross-sectional view illustrating a gas plug according to Example 2. FIG. 4B is a view illustrating a state where the gas plug is welded, and is an enlarged cross-sectional view illustrating the vicinity of an injection opening of a housing. In Example 2, other configurations except for a shape of a gas plug 250 are similar to those of Example 1, and hence, the same configurations will be designated by the same reference numerals and descriptions thereof will be omitted.

The gas plug 250 according to Example 2 has a flange 252 that extends from an upper surface 250b side to an outward side in the lateral direction. A lower surface of the flange 252 is an inclined surface 252a that expands as it extends from a lower side toward an upper side in FIG. 4A.

As illustrated in FIG. 4B, the inclined surface 252a of the gas plug 250 is in contact with the inclined surface 110c of the housing, in a state where the gas plug 250 is fitted and welded to the concave portion of the housing 110.

In the configuration of Example 2, because the flange 252 of the gas plug 250 and the inclined surface 110c of the housing 110 make surface contact with each other, they can make more secure contact. That is, because the flange 252 of the gas plug 250 and the inclined surface 110c of the housing 110 are in surface contact, Example 2 is configured such that it is more difficult for a foreign matter to enter the space S, as compared with the configuration of Example 1. In addition, because the inclined surfaces are in contact with each other, an intrusion route of a foreign matter becomes long, and hence it becomes difficult for a foreign matter to enter between the gas plug 250 and the concave portion of the housing 110.

(Others)

Note that, in the above described examples, the gas plug is a columnar member. However, the gas plug is not limited to this shape, and may be in other shapes, such as a quadrangular pillar or a hexagonal pillar. In addition, external shapes of the flange portion and the gas plug may be different. (For example, an overall shape may be a quadrangular pillar and the flange portion may be a cylinder.) The concave portion of the housing may also be another shape so long as the shape corresponds to the shape of the gas plug. Further, in order to further improve the contact between the flange and the inclined surface of the housing, the flange may be pushed into the inclined surface of the housing or be swaged. When the contact between the flange and the inclined surface of the housing is improved, it becomes more difficult for a foreign matter to enter the space S.

REFERENCE SIGNS LIST

100: accumulator
110: housing
110a: bottom surface (concave portion)
110b: inner peripheral surface (concave portion)
110c: inclined surface
111: shell 112: gas end cover
112*a*: hexagonal nut
112*b*: injection opening
113: port member
113*a*: attachment portion
113*b*: pressure inflow port
120: bellows
150, 250: gas plug
150*a*: lower surface (gas plug)
150*b*: upper surface (gas plug)
151, 251: welding portion
152, 252: flange

The invention claimed is:

1. An accumulator comprising:
 a housing having an injection opening into which gas is injected; and
 a gas plug occluding the injection opening, the accumulator sealing the gas in the housing by the gas plug that is welded to the housing with a welding portion of the gas plug being melted;
 wherein the housing includes:
 a concave portion to which the gas plug occluding the injection opening is fitted, and to which the gas plug is welded with the welding portion being melted; and
 an inclined surface that extends from an edge portion of the concave portion toward an outside of the housing such that a distance from a center of the injection opening increases; and
 the gas plug includes a flange which makes contact with the inclined surface in a state of being fitted and welded to the concave portion.

2. The accumulator according to claim 1, wherein the flange includes an inclined surface which makes contact with the inclined surface of the housing.

* * * * *